United States Patent Office 3,493,570
Patented Feb. 3, 1970

3,493,570
QUINOLINE DERIVATIVES
Janis Plostnieks, Philadelphia, Pa., assignor to McNeil Laboratories, Inc., a corporation of Pennsylvania
No Drawing. Filed Mar. 30, 1967, Ser. No. 626,980
Int. Cl. C07d 33/34, 33/18; A61k 27/00
U.S. Cl. 260—247.5                    10 Claims

ABSTRACT OF THE DISCLOSURE

The compounds herein are 3,4-dihydro-4-methyl-4-phenyl-6-chloro-quinoline derivatives useful as anti-inflammatory agents.

---

This invention relates to novel quinoline derivatives and, more particularly, to certain 3,4-dihydro-4-methyl-4-phenyl-6-chloro-quinolines and the preparation thereof. These novel compounds may be structurally represented as follows:

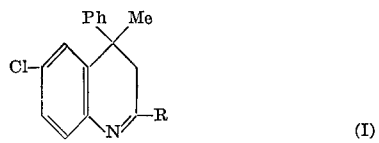

wherein R is a member selected from the group consisting of ethoxy, lower alkyl-amino, di-(lower alkyl)-amino, benzyl-amino, di-(lower alkyl)-amino-lower alkyl-amino, carboxy-methyl-amino, hydroxylamino and heterocyclic amino. The therapeutically active acid addition salts of (1) are also embraced within the scope of this invention.

As used herein, lower alkyl may be straight or branch chained saturated aliphatic hydrocarbons having from 1 to about 6 carbon atoms, such as, for example, methyl, ethyl, propyl, isopropyl, butyl, t-butyl, pentyl, hexyl and the like. The term heterocyclic amino means a 5- to 6-membered saturated azaheterocyclic group, the aza member of which is the linking atom to the dihydroquinoline nucleus. The heterocyclic group may comprise, in addition to the linking nitrogen atom, an alkylene chain of from 4 to 5 uninterrupted carbon atoms or an alkylene chain of 4 carbon atoms interrupted by a hetero atom such as oxygen, sulfur or nitrogen. Typical of such heterocyclic aminos are pyrrolidinyl, piperidino, morpholino, thiamorpholino, piperazino and the like. The preferred heterocyclic aminos are pyrrolidinyl and morpholino.

The compound of Formula I, wherein R is ethoxy (II), may be prepared from 3,4-dihydro-4-methyl-4-phenyl-6-chloro-carbostyril (III) by treatment with triethyl oxonium fluoborate in a suitable organic solvent, e.g., a halogenated hydrocarbon, methylene chloride being preferred, to form the corresponding fluoborate salt which is then treated with a base such as, for example, an alkali metal hydroxide or carbonate, or a tertiary amine, e.g., triethylamine, and the like. The reaction scheme may be illustrated as follows:

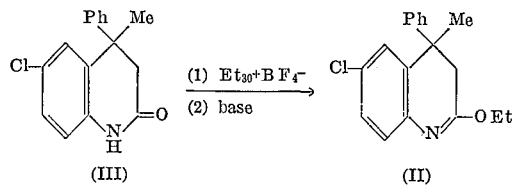

The starting compound (III) is obtained from the cyclization of 4'-chloro-β-methyl-cinnamanilide by treatment with an appropriate cyclizing agent such as concentrated sulfuric acid, polyphosphoric acid and the like.

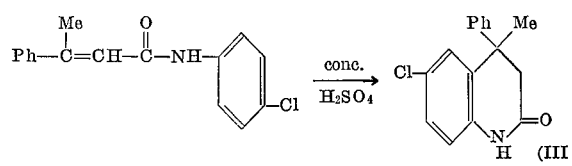

By treatment of the imino ether of Formula II with appropriate primary and secondary amines, the other compounds of Formula I are obtained, i.e., where R equals the respectively defined amino groups. Among the primary and secondary amines that are operable herein are mono-(lower alkyl)-amines, e.g., methylamine, ethylamine, isopropylamine and the like; di-(lower alkyl)-amines, e.g., dimethylamine, methylethylamine, diethylamine and the like; benzylamine; di-(lower alkyl)-amino-(lower alkyl)-amines, e.g., β-dimethylamino-ethylamine, γ-dimethylamino-propylamine and the like; carboxy-methyl-amines, e.g., glycine, alanine, valine, and the like; hydroxylamine; and heterocyclic amines, e.g., pyrrolidine, morpholine, piperidine and the like. Elevated temperatures, preferably under reflux, may be advantageously employed during the reaction. Suitable solvents include such polar organic solvents as a lower alkanol, pyridine and the like.

Therapeutically active acid addition salts of (I) include those obtainable by reacting the base with an appropriate acid, as for example, an inorganic acid such as hydrochloric, sulfuric, phosphoric and the like acids, or an organic acid such as acetic, lactic, maleic, malonic, fumaric, benzoic, benzenesulfonic and the like acids.

The compounds of Formula I, wherein R is other than ethoxy, have been found to possess valuable pharmacological properties. Such compounds are useful as anti-inflammatory agents as demonstrated by their ability to inhibit kaolin-induced edema in the rat paw upon oral administration at doses of about 50–100 mg./kg. of body weight. These novel compounds can be administered in therapeutic dosages in conventional pharmaceutical formulations for oral and parenteral administration. Typical of such inhibiting activity observed with these compounds is the following: at a dose of 50 mg./kg., a 40% inhibition when R is methylamino; and at a dose of 100 mg./kg., a 32% inhibition when R is morpholino, a 19% inhibition when R is hydroxylamino, and a 41% inhibition when R is pyrrolidinyl.

The subject compound, wherein R is ethoxy, is useful as the starting material in the syntheses of the other compounds of Formula I. Such syntheses are demonstrated in the following examples.

EXAMPLE I

β-Methylcinnamic acid (47 g., 0.29 mole) is suspended in 50 ml. of benzene. Thionyl chloride (36 g., 0.30 mole) is added and the reaction mixture is heated in an oil bath at 50° C. for 1.5 hrs. with stirring. (Caution: higher temperatures cause extensive decomposition.) The solvent is removed under reduced pressure and the resulting amber colored β-methyl cinnamoyl chloride is used in the next step without further purification.

p-Chloroaniline is recrystallized from benzene-methylcyclohexane and a 44 g. (0.35 mole) sample is suspended in 200 ml. of methylene chloride. A solution of potassium hydroxide (22.9 g., 0.41 mole, in 300 ml. of water) is added. The two phase reaction mixture is cooled in an ice-bath and a solution of the above prepared β-methyl cinnamoyl chloride in 50 ml. of methylene chloride is added over a period of 10 min. with vigorous stirring. The reaction mixture is stirred for an additional 10 min. at room temperature. The water layer is extracted with methylene chloride and the combined methylene chloride solutions are washed with 1N hydrochloric acid and water. The solution is dried over anhydrous magnesium sulfate and the solvent is removed. The residue crystallizes giving a yellow solid, M.P. 115–131° C. Two recrystallizations from benzene give a white solid, 4'-chloro-β-methyl-cinnamanilide, M.P. 129.5–132.5° C.

*Analysis.*—Calcd. for $C_{16}H_{14}ClNO$: C, 70.71; H, 5.19; N, 5.16%. Found: C, 70.94; H, 5.29; N, 5.02%.

EXAMPLE II

4'-chloro-β-methylcinnamanilide (25.9 g., 0.096 mole) is suspended in 105 ml. of concentrated sulfuric acid at room temperature. The reaction mixture is stirred for 0.5 hr. (For larger batches it is advisable to pre-cool the sulfuric acid since the reaction is slightly exothermic.) The solution is poured over 300 g. of ice. The resulting suspension is extracted with chloroform. The chloroform solution is washed several times with water and dried over anhydrous magnesium sulfate. Evaporation of the solvent yields 3,4-dihydro-4-methyl-4-phenyl-6-chloro-carbostyril as a white solid, M.P. 208–210° C. The solid is recrystallized from ethyl acetate, M.P. 208.5–210° C.

*Analysis.*—Calcd. for $C_{16}H_{14}ClNO$: C, 70.71; Cl, 13.05; N, 5.16%. Found: C, 70.88; Cl, 12.90; N, 4.95%.

EXAMPLE III 3,4-dihydro-4-methyl-4-phenyl - 6 - chloro - carbostyril (100 g., 0.37 mole) is added to a solution of 300 ml. of anhydrous methylene chloride containing 78 g. (0.41 mole) of triethyloxonium fluoborate. The reaction mixture is stirred at room temperature overnight. Insolubles are removed by filtration. The filtrate is added to a rapidly stirring solution of 100 ml. of 10% sodium hydroxide solution which has been cooled in an ice-bath. The layers are separated and the organic layer is dried over anhydrous magnesium sulfate and evaporated. The residue is boiled in methylcyclohexane and insoluble material is removed by filtration. The filtrate is kept at room temperature overnight and more insoluble material is removed. The filtrate is evaporated giving a colorless oily residue which is dissolved in anhydrous ether and poured through a column containing 300 g. of alumina, to give an oil which crystallizes on standing, M.P. 66–68° C. The product, 2-ethoxy-3,4-dihydro-4-methyl-4 - phenyl-6-chloro-quinoline, is recrystallized from n-hexane (M.P. 66–68° C.).

*Analysis.*—Calcd. for $C_{18}H_{18}ClNO$: C, 72.11; H, 6.05; N, 4.67%. Found: C, 71.87; H. 6.11; N, 4.71%.

EXAMPLE IV

2 - ethoxy - 3,4 - dihydro - 4 - methyl - 4 - phenyl - 6-chloro-quinoline (10.7 g., 0.039 mole) is suspended in 100 ml. of anhydrous ethanol. To the suspension is added 12.5 ml. of pyrrolidine. The reaction mixture is stirred and heated under reflux overnight. The solvent is evaporated in vacuo. The oily residue is crystallized from ethyl acetate yielding 2-pyrrolidinyl-3,4-dihydro-4-methyl-4-phenyl-6-chloro-quinoline; M.P. 156–160° C., about 71% yield. Recrystallization from ethyl acetate raises the melting point to 159–161° C.

*Analysis.*—Calcd. for $C_{20}H_{21}ClN_2$: C, 73.94; H, 6.51; N, 8.64%. Found: C, 74.00; H, 6.57; N, 8.50%.

EXAMPLE V

2 - ethoxy - 3,4 - dihydro - 4 - methyl - 4 - phenyl - 6-chloro-quinoline (10.7 g., 0.039 mole) is suspended in 100 ml. of anhydrous ethanol. To the suspension is added 14 ml. of morpholine. The reaction mixture is stirred and heated under reflux for 48 hrs. The solvent is evaporated in vacuo. Thite white semi-crystalline residue is crystallized from ethyl acetate giving the product, 2-morpholino-3,4-dihydro-4-methyl-4-phenyl-6 - chloro - quinoline; M.P. 163–165.5° C., about 66% yield.

*Analysis.*—Calcd. for $C_{20}H_{21}ClN_2O$: C, 70.47; H, 6.21; N, 8.22%. Found: C, 70.25; H, 6.48; N, 8.06%.

EXAMPLE VI 2-ethoxy - 3,4-dihydro - 4 - methyl - 4-phenyl - 6-chloro-quinoline (12 g., 0.40 mole) is suspended in 150 ml. of anhydrous ethanol. Monomethylamine gas is bubbled into the reaction mixture until the solution is at pH 10. The flask is cooled in an ice bath during the addition. The reaction is then heated under reflux for 7 days. The solvent is evaporated in vacuo and the residue is dissolved in methanol and ethereal hydrogen chloride is added. A white solid which precipitates is removed by filtration, M.P. 279–286° C., about 89% yield. The product, 2 - methylamino - 3,4 - dihydro - 4 - methyl - 4-phenyl-6-chloro-quinoline hydrochloride, is recrystallized from methanol-ether (M.P. 284–286° C.). The free base is obtained by neutralization of the salt with suitable alkali, e.g., sodium hydroxide.

*Analysis.*—Calcd. for: $C_{17}H_{17}N_2Cl$: C, 63.59; H, 5.65; N, 8.72%. Found: C, 63.80; H, 5.75; N, 8.45%.

EXAMPLE VII (A) 2-ethoxy - 3,4-dihydro - 4 - methyl - 4 - phenyl - 6-chloro-quinoline (15.50 g., 0.058 mole) is suspended in 150 ml. of anhydrous ethanol. To the suspension is added 17 ml. of monoamylamine. The reaction is heated under reflux for 6 days. The solvent is evaporated in vacuo and the residue is suspended in methylene chloride and washed with 1 N hydrochloric acid. The organic layer is washed with 10% sodium hydroxide, dried over anhydrous magnesium sulfate, and evaporated in vacuo. The residue is converted to its hydrochloride salt by the addition of ethereal hydrogen chloride. The salt is dissolved in ethyl acetate and allowed to crystallize slowly in a refrigerator, yielding 2-pentylamino-3,4-dihydro-4-methyl-4-phenyl-6-chloro-quinoline, M.P. 180°–182° C. Neutralization of the salt with suitable alkali, e.g., sodium hydroxide, affords the free base.

*Analysis.*—Calcd. for: $C_{21}H_{26}Cl_2N_2$: C, 66.84; H, 6.95; N, 7.43%. Found: C, 67.01; H, 7.01; N, 7.42%.

(B) The procedure of Example VII–A is repeated except that an equivalent quantity of diethylamine and methylethylamine, respectively, is used in place of the amylamine used therein to yield, as respective product, the corresponding 2-diethylamino and 2-methyl-ethyl-amino derivatives of 3,4-dihydro-4-methyl-4-phenyl-6-chloro-quinoline as the hydrochloride salt and free base.

EXAMPLE VIII 2-ethoxy - 3,4-dihydro - 4-phenyl - 6-chloro-quinoline (12 g., 0.04 mole) is suspended in 100 ml. of absolute ethanol. To the suspension is added 15 ml. of dimethlaminopropylamine. The reaction mixture is stirred and heated under reflux for 6 days. The solvent is evaporated in vacuo. The only residue is crystallized from methylcyclohexane giving the product, 2 - [3 - (dimethylamino)-propylamino] - 3,4-dihydro - 4-phenyl - 6-chloro-quinoline; M.P. 117–119° C. Recrystallization from the same solvent raises the melting point to 118–120° C.

*Analysis.*—Calcd. for $C_{21}H_{26}ClN_3$: C, 70.87; H, 7.36; N, 11.80%. Found: C, 70.85; H, 7.40; N, 11.84%.

EXAMPLE IX (A) 2 - ethoxy - 3,4 - dihydro - 4 - methyl - 3 - phenyl-6-chloro-quinoline (8.05 g., 0.027 mole) is suspended in 60 ml. of anhydrous ethanol. To the suspension is added 1.80 g. (0.026 mole) of glycine. The reaction is stirred and heated at reflux temperature overnight and then cooled in an ice bath. The resulting white solid, 2-carboxymethylamino - 3,4 - dihydro-4-methyl-4-phenyl-6-chloro-quinoline, is removed by filtration, M.P. 258–264° C.

*Analysis.*—Calcd. for: $C_{18}H_{17}ClN_2O_2$: C, 65.75; H, 5.21; N, 8.52%. Found: C, 65.50; H, 5.01; N, 8.37%.

(B) By repeating the procedure outlined in Example IX–A, except that an equivalent quantity of alanine and valine, respectively, is used in place of the glycine used therein, there are obtained, as respective products, the corresponding 2-carboxymethylamino derivatives of 3,4-dihydro-4-methyl-4-phenyl-6-chloro-quinoline.

EXAMPLE X (A) 2-ethoxy - 3,4-dihydro - 4-methyl - 4-phenyl - 6-chloro-quinoline (0.50 g., 0.0017 mole) is dissolved in 15 ml. of anhydrous ethanol. To the solution is added 0.25 g. (0.0034 mole) of hydroxylamine hydrochloride and 0.51 ml. of triethylamine. The reaction is heated under reflux for five days. The solvent is evaporated in vacuo. The residue is dissolved in methylene chlorine and washed with water. The organic layer is dried over anhydrous magnesium sulfate and evaporated to give a colorless oily residue which is dissolved in methanol. Ethereal hydrogen chloride is added and the product, 2-hydroxylamino - 3,4-dihydro - 4-methyl - 4-phenyl - 6-chloro-quinoline hydrochloride, is collected by filtration (M.P. 228–230° C.)

*Analysis.*—Calcd. for $C_{16}H_{16}Cl_2N_2O$: C, 59.45; H, 4.99; N, 8.67%. Found: C, 59.32; H, 5.00; N, 8.39%.

EXAMPLE XI 2-ethoxy - 3,4-dihydro - 4-methyl - 4-phenyl - 6-chloro-quinoline (0.5 g., 0.0017 mole) is dissolved in 15 ml. of anhydrous ethanol. To the solution is added 0.2 g. (0.0019 mole) of benzylamine. The reaction mixture is heated under reflux for 6 days. The solvent is evaporated in vacuo. The residue is dissolved in methanol and ethereal hydrogen chloride is added to yield the hydrochloride salt of 2-benzylamino - 3,4-dihydro - 4-methyl - 4-phenyl-6-chloro-quinoline (M.P. 185–190° C.). Recrystallization from methanol-ether raises the melting point to 189–191° C.

What is claimed is:

1. A member selected from the group consisting of 3,4-dihydro-4-methyl-4-phenyl-6-chloro-quinoline having the formula:

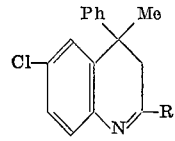

wherein R is a member selected from the group consisting of ethoxy, lower alkyl-amino, di-(lower alkyl)-amino, benzyl-amino, di-(lower alkyl)-amino-lower alkyl-amino, carboxy-lower alkyl-amino, hydroxylamino, pyrrolidinyl and morpholino and the therapeutically active acid addition salts thereof.

2. The compound of claim 1 which is 2-pyrrolidinyl-3,4-dihydro-4-methyl-4-phenyl-6-chloro-quinoline.

3. The compound of claim 1 which is 2-morpholino-3,4-dihydro-4-methyl-4-phenyl-6-chloro-quinoline.

4. The compound of claim 1 which is 2-[3-(dimethylamino) - propylamino] - 3,4-dihydro-4-methyl-4-phenyl-6-chloro-quinoline.

5. The compound of claim 1 which is 2-carboxymethylamino-3,4-dihydro-4-methyl-4-phenyl-6-chloro-quinoline.

6. The compound of claim 1 which is 2-(lower alkyl-amino) - 3,4 - dihydro-4-methyl-4-phenyl-6-chloro-quinoline.

7. The compound of claim 1 which is 2-(di-lower alkyl-amino) - 3,4 - dihydro-4-methyl-4-phenyl-6-chloro-quinoline.

8. The compound of claim 1 which is 2-hydroxyamino-3,4-dihydro-4-methyl-4-phenyl-6-chloro-quinoline.

9. The compound of claim 1 which is 2-benzylamino-3,4-dihydro-4-methyl-4-phenyl-6-chloro-quinoline.

10. 2 - ethoxy-3,4-dihydro-4-methyl-4-phenyl-6-chloro-quinoline.

References Cited

UNITED STATES PATENTS 3,435,041   3/1969   Drukker et al. _____ 260—288

ALEX MAZEL, Primary Examiner

A. M. T. TIGHE, Assistant Examiner

U.S. Cl. X.R.

260—286, 288, 289, 287, 243, 268; 424—258, 248

PO-1050
(5/69)

UNITED STATES PATENT OFFICE
CERTIFICATE OF CORRECTION

Patent No. 3,493,570      Dated    February 3, 1970

Inventor(s)   Janis Plostnieks

It is certified that error appears in the above-identified patent and that said Letters Patent are hereby corrected as shown below:

In column 4, line 47, the numeral "7.42%" should read -- 7.24% --. Same column, line 62, 5he word "only" should read -- oily --. Column 5, line 21, the word "chlorine" should read -- chloride --.

SIGNED AND
SEALED

JUL 7 1970

(SEAL)
Attest:

Edward M. Fletcher, Jr.
Attesting Officer

WILLIAM E. SCHUYLER, JR.
Commissioner of Patents